US012209561B2

(12) United States Patent
Steinman

(10) Patent No.: US 12,209,561 B2
(45) Date of Patent: Jan. 28, 2025

(54) PUMP FOR EVAPORATIVE EMISSIONS SYSTEM

(71) Applicant: STONERIDGE CONTROL DEVICES, INC., Novi, MI (US)

(72) Inventor: Robert James Steinman, Lexington, OH (US)

(73) Assignee: STONERIDGE ELECTRONICS AB, Solna (SE)

( * ) Notice: Subject to any disclaimer, the term of this patent is extended or adjusted under 35 U.S.C. 154(b) by 180 days.

(21) Appl. No.: 17/765,628

(22) PCT Filed: Sep. 15, 2020

(86) PCT No.: PCT/US2020/050882
§ 371 (c)(1),
(2) Date: Mar. 31, 2022

(87) PCT Pub. No.: WO2021/067031
PCT Pub. Date: Apr. 8, 2021

(65) Prior Publication Data
US 2022/0403801 A1 Dec. 22, 2022

Related U.S. Application Data

(60) Provisional application No. 62/910,708, filed on Oct. 4, 2019.

(51) Int. Cl.
*F02M 25/08* (2006.01)
*F04C 18/34* (2006.01)
(Continued)

(52) U.S. Cl.
CPC .... *F02M 25/0818* (2013.01); *F02M 25/0836* (2013.01); *F04C 18/3446* (2013.01); *F04C 29/0092* (2013.01)

(58) Field of Classification Search
CPC ............... F02M 25/08; F02M 25/0818; F02M 25/0836; F04C 18/34; F04C 18/3446;
(Continued)

(56) References Cited

U.S. PATENT DOCUMENTS 1,409,548 A * 3/1922 Imhoff .................. F04C 2/3446 418/266
2,312,961 A * 3/1943 Cowherd ............ F01C 21/0836 418/265
(Continued)

FOREIGN PATENT DOCUMENTS

CN 102498298 A 6/2012
JP S54161102 A 12/1979
(Continued)

OTHER PUBLICATIONS

International Preliminary Report on Patentability for International Application No. PCT/US2020/050882 mailed Apr. 14, 2022.
(Continued)

*Primary Examiner* — Logan M Kraft
*Assistant Examiner* — Johnny H Hoang
(74) *Attorney, Agent, or Firm* — Carlson, Gaskey & Olds, P.C.

(57) ABSTRACT

A rotary vane pump includes a housing that includes first and second plates respectively secured to first and second opposing sides of an intermediate plate. The intermediate plate includes a bore and inlet and outlet ports. The first and second sides respectively have first and second passages that are respectively in fluid communication with the inlet and outlet ports. The first and second passages are in fluid communication with the bore. The intermediate plate is reversible with respect to the first and second plates. A rotor
(Continued)

is arranged in the bore. The rotor supports slidable vanes that are configured to pump fluid between the inlet and outlet ports.

27 Claims, 5 Drawing Sheets

(51) Int. Cl.
*F04C 18/344* (2006.01)
*F04C 29/00* (2006.01)

(58) Field of Classification Search
CPC .... F04C 29/00; F04C 29/0092; F04C 18/344; F04C 29/12
USPC .................................................. 417/266–269
See application file for complete search history.

(56) References Cited

U.S. PATENT DOCUMENTS

| | | | | |
|---|---|---|---|---|
| 2,588,430 | A * | 3/1952 | Svenson | F04C 2/3446 418/269 |
| 3,386,648 | A | 6/1968 | Van Rossem | |
| 3,552,895 | A | 1/1971 | Bayley | |
| 4,286,933 | A | 9/1981 | Sakamaki et al. | |
| 5,408,866 | A | 4/1995 | Kawamura et al. | |
| 5,474,050 | A | 12/1995 | Cook et al. | |
| 5,987,968 | A | 11/1999 | Cook et al. | |
| 6,044,314 | A | 3/2000 | Cook et al. | |
| 7,004,013 | B2 | 2/2006 | Kobayashi et al. | |
| 7,594,500 | B2 | 9/2009 | Rockwell et al. | |
| 9,291,128 | B2 | 3/2016 | Dudar | |
| 9,458,801 | B2 | 10/2016 | Dudar et al. | |
| 9,464,600 | B2 | 10/2016 | Yasuzaka et al. | |
| 9,587,595 | B2 | 3/2017 | Woods et al. | |
| 9,638,145 | B2 | 5/2017 | Itoh et al. | |
| 9,797,346 | B2 | 10/2017 | Takakura | |
| 9,822,737 | B2 | 11/2017 | Dudar et al. | |
| 2004/0170516 | A1 | 9/2004 | Hinchey, Jr. | |
| 2005/0036897 | A1 | 2/2005 | Kasmer | |
| 2016/0281715 | A1* | 9/2016 | Tuckey | F01C 21/0863 |
| 2017/0328806 | A1 | 11/2017 | Kaneko et al. | |
| 2019/0186422 | A1 | 6/2019 | Dudar et al. | |

FOREIGN PATENT DOCUMENTS

| | | | |
|---|---|---|---|
| JP | 2005330895 | A | 12/2005 |
| JP | 2008240649 | A | 10/2008 |
| JP | 2009144677 | A | 7/2009 |
| JP | 2014047677 | A | 3/2014 |
| WO | 2004005709 | A1 | 1/2004 |
| WO | 2011154237 | A2 | 12/2011 |

OTHER PUBLICATIONS

Supplementary European Search Report for European Application No. 20871195.2 mailed Nov. 4, 2022.
International Search Report and Written Opinion for International Application No. PCT/US2020/050882 mailed Jan. 5, 2021.
Japanese Office Action for Japanese Application No. 2022-520856 mailed May 7, 2024.
Chinese Office Action for Chinese Application No. 2020800703763 mailed Aug. 17, 2024.

* cited by examiner

PUMP FOR EVAPORATIVE EMISSIONS SYSTEM

CROSS-REFERENCE TO RELATED APPLICATIONS

This application claims priority to U.S. Provisional Application No. 62/910,708 filed on Oct. 4, 2019, and is incorporated herein by reference.

BACKGROUND

The disclosure relates to a rotary vane pump that is used, for example, to create a vacuum or pressure condition during a leak test procedure in an evaporative emissions systems of a gasoline powered vehicle.

Evaporative emissions systems have long been required for gasoline powered vehicles. The system must undergo a leak test during a vehicle start-up procedure to ensure that fuel vapors will not leak into the atmosphere. A pump is used either to create a vacuum or pressurize the system. An external filter is used to prevent contamination that could damage the pump or other components of the system during operation. Various valves may be closed during this test procedure to maintain system pressure, and the pressure is monitored to determine if there are any leaks.

The pump used in such a system may be relatively expensive to produce as many of the pump's dimensions are critical, requiring machining. Furthermore, if a multi-plate configuration is used, the plates are unique with respect to one another.

SUMMARY

In one exemplary embodiment, a rotary vane pump includes a housing that includes first and second plates respectively secured to first and second opposing sides of an intermediate plate. The intermediate plate includes a bore and inlet and outlet ports. The first and second sides respectively have first and second passages that are respectively in fluid communication with the inlet and outlet ports. The first and second passages are in fluid communication with the bore. The intermediate plate is reversible with respect to the first and second plates. A rotor is arranged in the bore. The rotor supports slidable vanes that are configured to pump fluid between the inlet and outlet ports.

In a further embodiment of any of the above, at least one of the first and second sides includes a pocket with a filter. The pocket is fluidly arranged in one of the first and second passages.

In a further embodiment of any of the above, the first and second plates and the intermediate plate include holes with fasteners that are disposed therein to clamp the first and second plates to the intermediate plate. A motor is mounted to the first plate.

In a further embodiment of any of the above, the first and second plates and the intermediate plate include locating holes that are configured to receive pins during a rotary pump assembly procedure.

In a further embodiment of any of the above, the bore is elliptically shaped. The rotor separates the bore into first and second cavities that are respectively in fluid communication with the first and second passageways.

In a further embodiment of any of the above, the bore is circular that provides a singular cavity having a crescent shape.

In a further embodiment of any of the above, the first and second plates and the intermediate plate are plastic. The first and second sides respectively abut the first and second plates without any additional sealing structure therebetween.

In a further embodiment of any of the above, the first and second sides respectively include first and second surfaces that are unmachined.

In a further embodiment of any of the above, the first and second surfaces are provided by injection molding.

In a further embodiment of any of the above, the intermediate plate is symmetrical about an axis between positions 180° apart.

In another exemplary embodiment, an evaporative emissions system includes an evaporative component. A pump is fluidly connected to the evaporative component. The pump includes a housing that includes first and second plates respectively secured to first and second opposing sides of an intermediate plate. The intermediate plate includes a bore and inlet and outlet ports. The first and second sides respectively have first and second passages that are respectively in fluid communication with the inlet and outlet ports. The first and second passages are in fluid communication with the bore. The intermediate plate is reversible with respect to the first and second plates. A rotor is arranged in the bore. The rotor supports vanes that are configured to pump fluid between the inlet and outlet ports. A controller is in communication with the pump. The controller is configured to maintain a pressure on the system during a leak test procedure.

In a further embodiment of any of the above, the evaporative component includes at least one of a charcoal canister and a fuel tank, and includes at least one valve that is arranged a closed position during the leak detection procedure.

In a further embodiment of any of the above, the at least one valve is a check valve and another valve. The check valve is arranged downstream from the outlet port.

In a further embodiment of any of the above, the system includes is a pressure gauge in communication with the controller and is configured to monitor a system pressure during the leak test procedure.

In a further embodiment of any of the above, at least one of the first and second sides includes a pocket with a filter. The pocket is fluidly arranged in one of the first and second passages.

In a further embodiment of any of the above, the first and second plates and the intermediate plate are plastic. The first and second sides respectively abut the first and second plates without any additional sealing structure therebetween. The first and second sides respectively include first and second surfaces that are unmachined.

In a further embodiment of any of the above, the intermediate plate is symmetrical about an axis between positions 180° apart.

In another exemplary embodiment, a method of assembling a rotary vane pump includes arranging a first plate into abutting engagement with either a first side or a second side of an intermediate plate that is reversible with respect to the first plate. The method also includes disposing a rotor with slidable vanes into a bore in the intermediate plate. The method further includes arranging a second plate into abutting engagement with the other of the first and second sides. The method further includes securing the first and second plates about the intermediate plate and rotor.

In a further embodiment of any of the above, the method includes a step of mounting a motor to the first plate. The motor is coupled to the rotor.

In a further embodiment of any of the above, at least one of the first and second sides includes a pocket with a filter.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
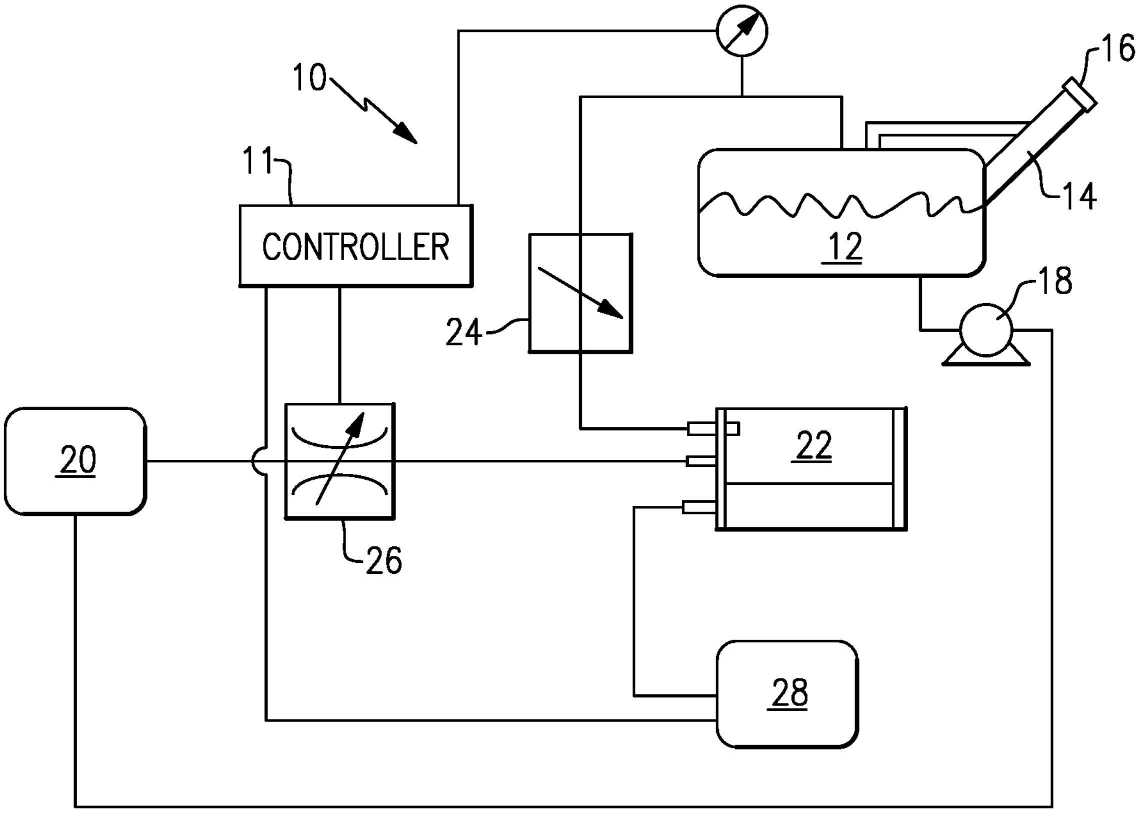
FIG. 1 schematically illustrates portions of one example evaporative fuel system.

FIG. 1 schematically illustrates a portion of an example evaporative fuel system 10. The system 10 includes a fuel tank 12 having a fuel filler 14 with a fill cap 16. A fuel pump 18 supplies gasoline, for example, from the fuel tank 12 to an internal combustion engine 20.

The system 10 is configured to capture and regulate the flow of fuel vapors within the system. In one example, a fuel tank isolation valve 24 is arranged fluidly between the fuel tank 12 and a charcoal canister 22, which captures and stores fuel vapors for later use by the engine 20. A purge valve 26 is fluidly connected between the charcoal canister 22 and the engine 20. A controller 11 regulates a position of the purge valve 26 to selectively provide the fuel vapors to the engine 20 during operation to make use of these fuel vapors.

The integrity of the system 10 must be periodically tested. One type of system 10 uses a leak detection module (LDM) 28, which can be used to pull a vacuum and/or pressurize the system to determine whether a leak exists, for example, using a pressure transducer 30. In one example leak test procedure, the purge valve 26 is closed and the controller 11 operates the leak detection module 28 to pressurize the system. Any change in pressure detected by the pressure transducer 30, which is monitored by the controller 11, is indicative of a leak.

Figure 2B:
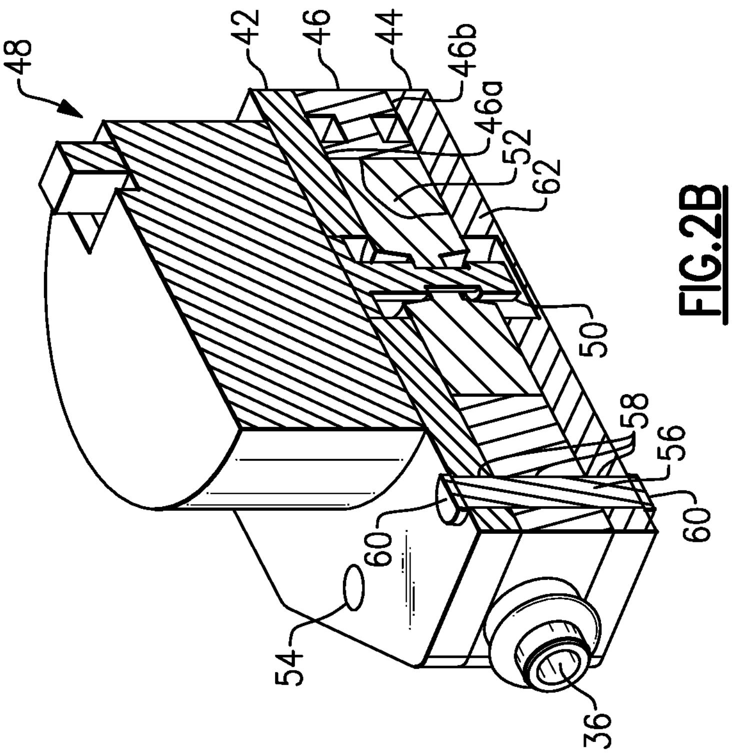
FIG. 2B is a cross-sectional view of the pump of FIG. 2A taken along lines 2B-2B.
Figure 2A:
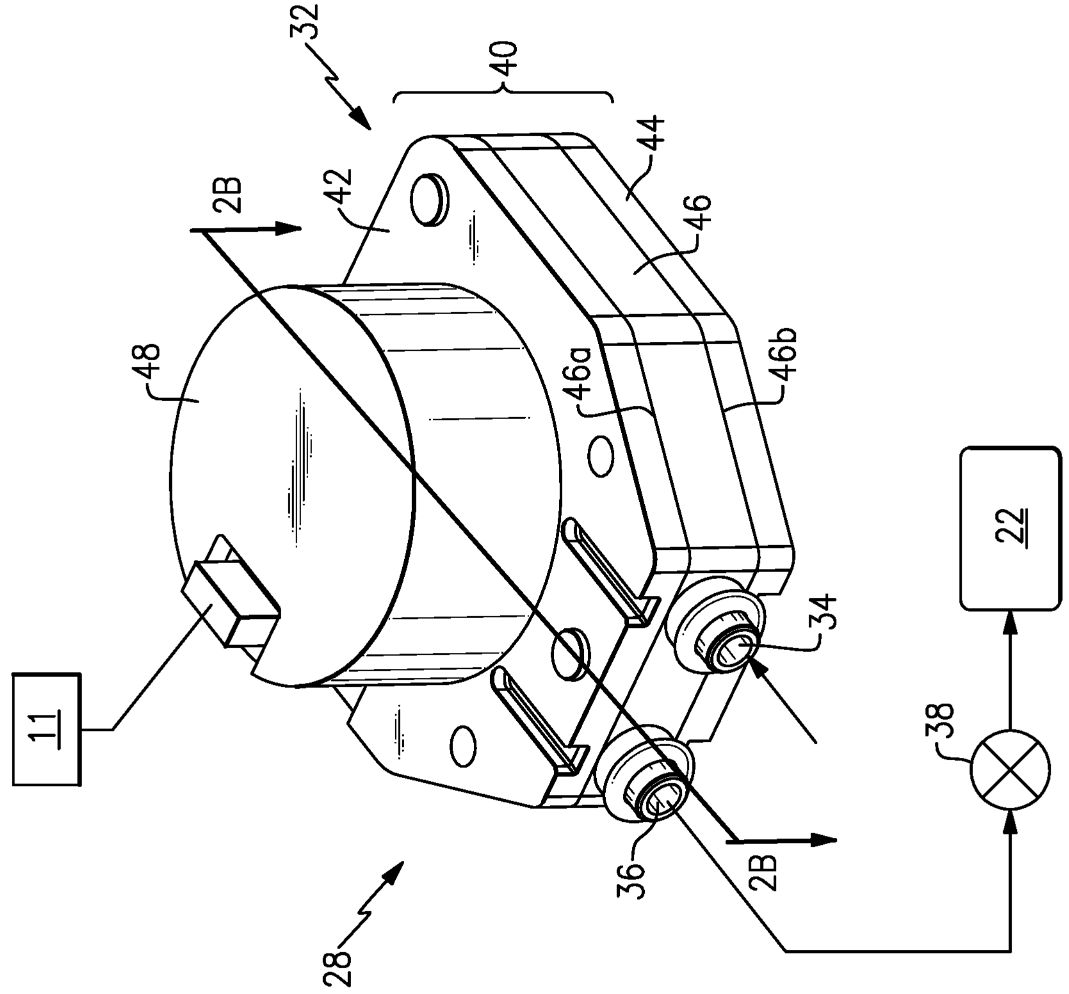
FIG. 2A is a perspective view of one example rotary vane pump according to the disclosure.

One example leak detection module 28 is shown in more detail in FIG. 2A. The module 28 includes a pump 32, which receives atmospheric air through an inlet port 34. The pump provides pressurized air to an outlet port 36, which may be supplied through a check valve 38 to the charcoal canister 22 or other evaporative component of the system 10.

The pump 32 has a housing 40 that is constructed from first and second plates 42, 44 secured on either side of an intermediate plate 46. In the example, the inlet and outlet ports 34, 36 are provided on an edge of the intermediate plate 46 rather than being provided on one or both of the first and second plates 42, 44. Referring to FIGS. 2A and 2B, the intermediate plate 46 has a first side 46*a* adjacent to and in abutment with the first plate 42, and a second side 46*b* is adjacent to and in abutment with the second plate 44. In the example, the first and second sides 46*a*, 46*b* abut and engage the first and second plates 42, 44 without any additional sealing structure (e.g., gaskets or sealant) therebetween. A motor 48 is mounted to the first plate and rotationally drives a rotor 52 received in a bore 62 of the intermediate plate 46 via a shaft 50.

In the example, the first, second, and intermediate plates 42, 44, 46 are constructed from a plastic material, such as nylon or polypropylene, for example, which may be graphite- or Teflon-filled. In one example, the plastic is injection molded, which provides surfaces having characteristics that are identifiable and indicative of the molding process (such as shrinkage and flow lines). The plates 42, 44, 46 include at least two locator holes 54 that are each configured to temporarily receive a through-pin during assembly of the pump 32 to precisely align the plates with one another. Fasteners 56 are received in fastener holes 58 in the first, second, and intermediate plates 42, 44, 46. In the example, the ends 60 of the fasteners 56, which may be metal, are plastically deformed to securely retain the first and second plates 42, 44 in a clamping relationship about the intermediate plate 46. Threaded fasteners, rivets or other types of fastening may also be used.

Figure 3B:
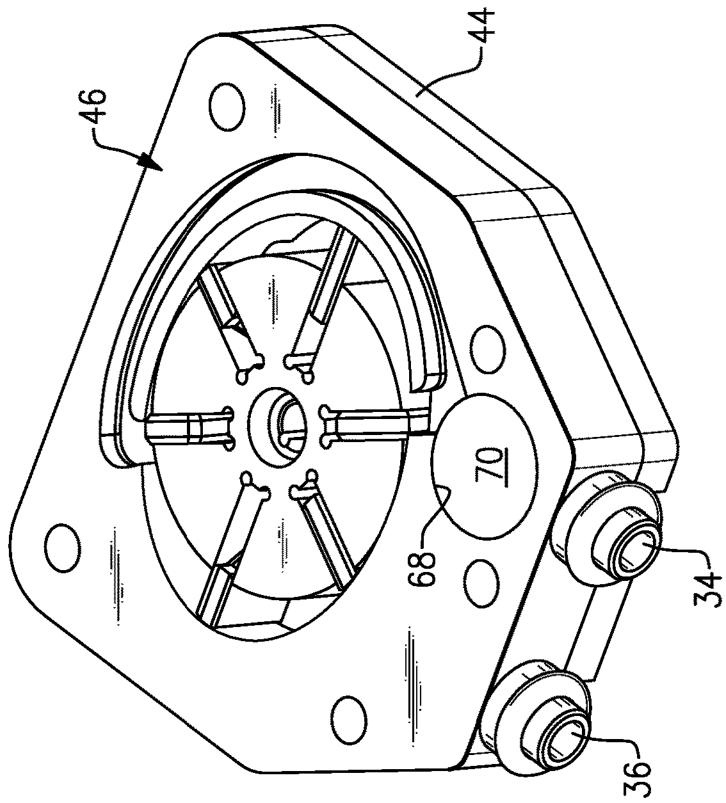
FIG. 3B is a perspective view of the intermediate plate with a filter installed.
Figure 3A:
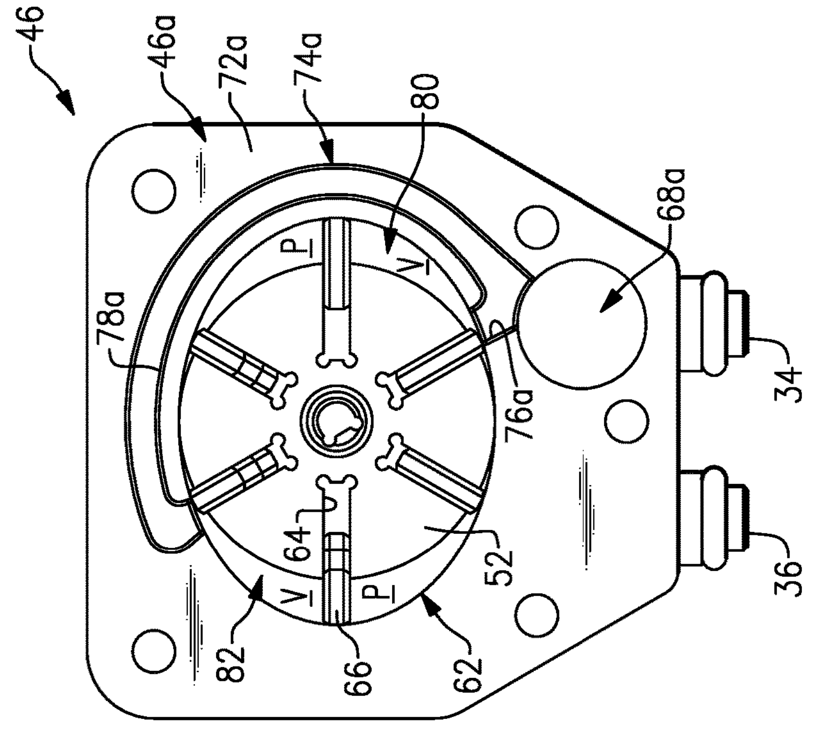
FIG. 3A illustrates an elevation view of the pump with a first plate removed, exposing a rotor in an intermediate plate.

The example pump 32 is a rotary vane configuration. Referring to FIGS. 3A and 3B, an elliptical bore 62 is illustrated. The rotor 52 includes multiple slots 64 about its circumference. The slots 64 slidably receive vanes 66 that are moveable within the slot to seal against the periphery of the bore 62 from centrifugal forces, as is known in rotary vane pumps. For the elliptical bore 62, two cavities 80, 82 are provided to create a two-chamber configuration that balances pressure across the rotor 52.

Figure 4B:
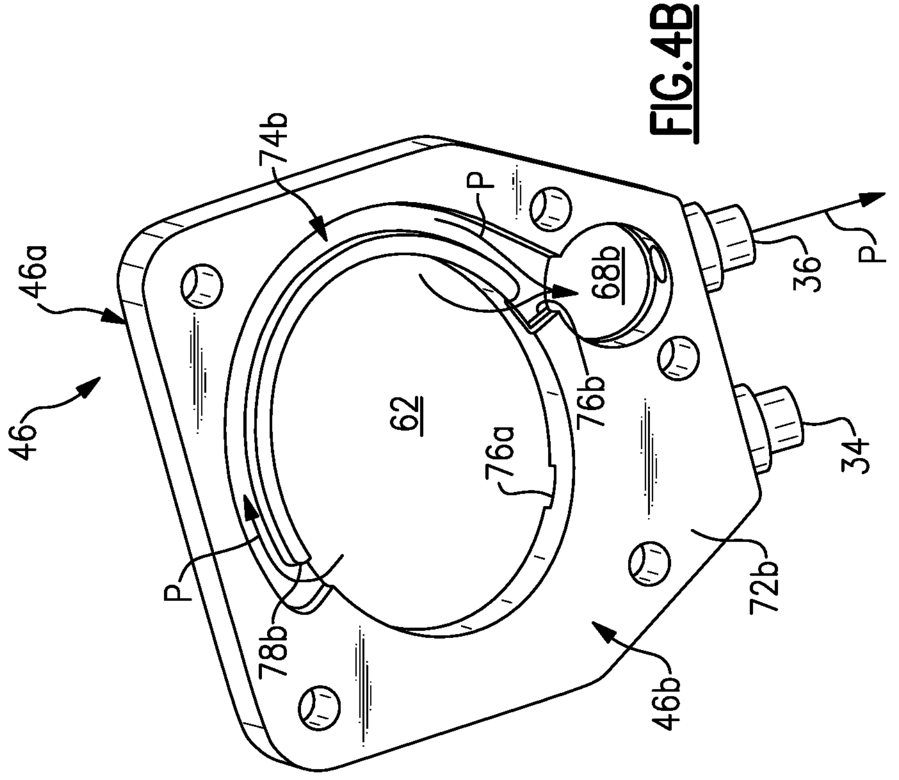
FIGS. 4A and 4B respectively are first and second side perspective views of the intermediate plate shown in FIG. 3B.
Figure 4A:
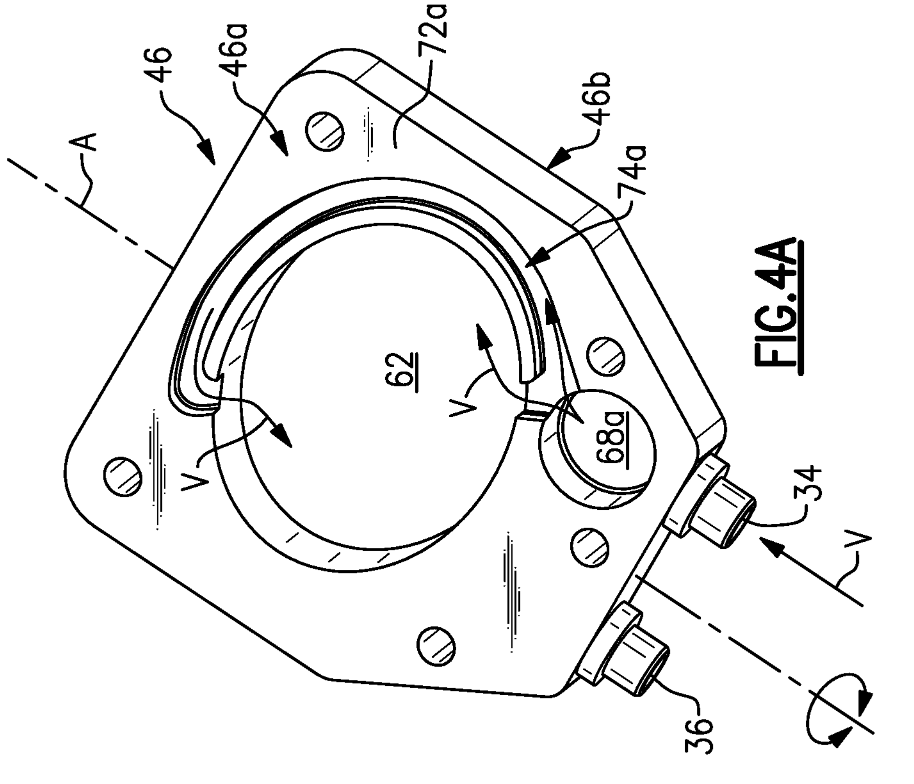

Referring to FIG. 4A, the intermediate plate 46 is reversible such that either side 46*a*, 46*b* may mate with either the first and second plate 42, 44. That is, the intermediate plate 46 is symmetrical about an axis A such that first and second surfaces 72*a*, 72*b* respectively provided by the first and second sides 46*a*, 46*b* and their corresponding fluid passages are the same if rotated 180° about the axis A. In one example, these surfaces 72*a*, 72*b* are unmachined (i.e., left as-molded, without lapping) as the disclosed pump configuration is sufficiently leak-tight such that more precise surfaces are not needed. But, machining may be used, if desired, to make the pump more leak-tight.

A first passage 74*a* on the first side 46*a* fluidly connects the inlet 34 to the bore 62, as shown in FIGS. 3A and 4A. The first passage 74*a* includes a first passageway 76*a* fluidly connected to the ambient side V of first cavity 80 and a second passageway 78*a* fluidly connected to the ambient side V the second cavity 82. The pocket 68*a* is arranged in the first passage 74*a* fluidly between the inlet port 34 and the bore 62.

In a similar manner, a second passage 74*b* on the second side 46*b* fluidly connects the outlet 36 to the bore 62, as shown in FIG. 4B. The second passage 74*b* includes a first passageway 76*b* fluidly connected pressure side P of the second cavity 82 and a second passageway 78*b* fluidly connected to the pressure side P of the first cavity 80. The pocket 68*b* is arranged in the second passage 74*b* fluidly between the outlet port 36 and the bore 62.

At least one of the pockets 68*a*, 68*b* receives a filter 70 (e.g., foam), but both pockets 68*a*, 68*b* may include a filter 70 if desired. In this manner, contaminants are filtered from the system 10 and no external lines or fittings are needed as the internal filter is contained within the pump 32. The LDM 28 does not require protection against ISO ultrafine dust (1-22 micron) due to its lack of a calibration orifice, which is incorporated in some types of leak detection pumps. The type of foam filter elements which may be incorporated into the LDM 28 may not prevent ultrafine dust from entering the pump assembly. But, this is not a risk to pump performance due to the relatively low concentration of dust relative to the volume of air passing through the pump 32.

Figure 6:
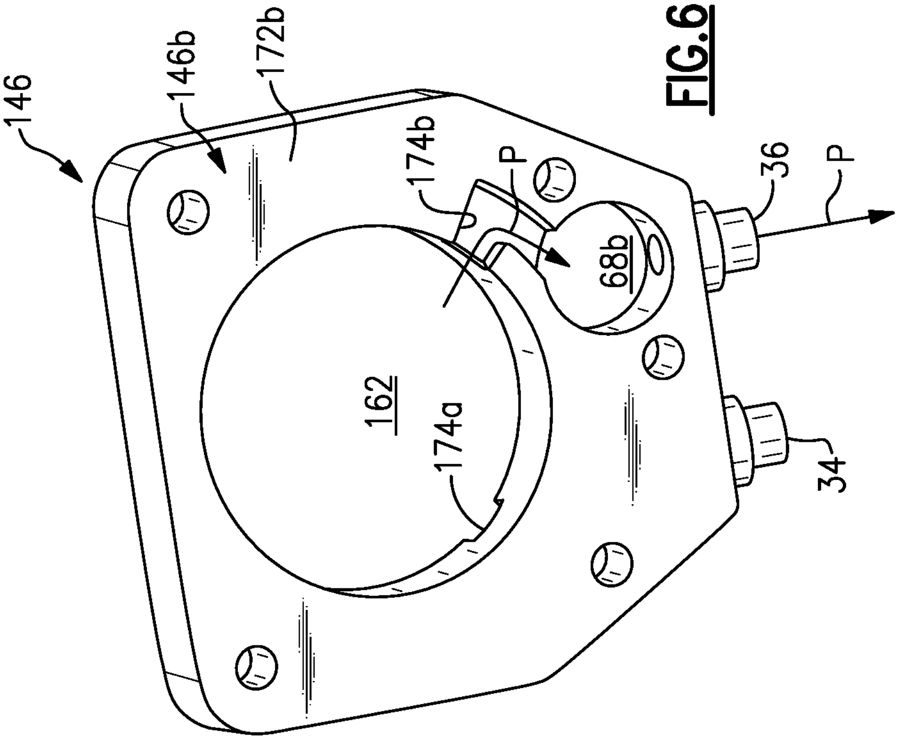
FIG. 6 illustrates an opposite side of the intermediate plate to the side shown in FIG. 5.
Figure 5:
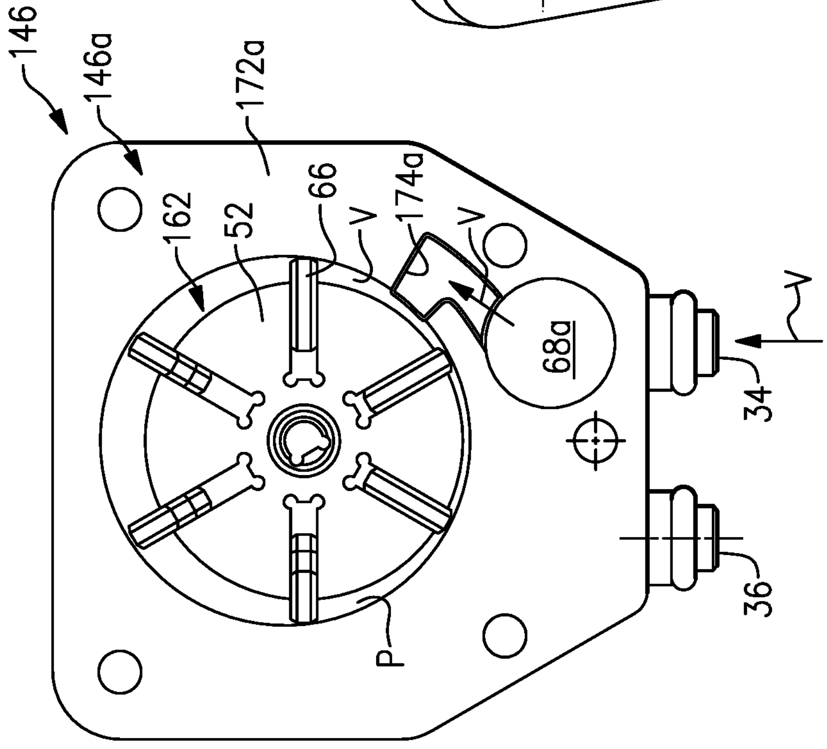
FIG. 5 is an elevation view of a single cavity pump with a round bore in the intermediate plate.

Another rotary vane configuration is shown in FIG. 5, which illustrates an intermediate plate 146 with a circular bore 162 having a single crescent-shaped cavity. In this example, the first side 146*a* and its first surface 172*a* have a first passage 174*a* fluidly connecting the pocket 68*a* to ambient side V of the bore 162. The intermediate plate 146 is reversible. As shown in FIG. 6, the second side 146*b* and its second surface 172*b* have a second passage 174*b* fluidly connecting the pocket 68*b* to pressure side P of the bore 162.

During manufacturing of the pump, the first plate 42 is arranged into abutting engagement with either the first side 46*a* or the second side 46*b* of the intermediate plate 46. That is, the intermediate plate is reversible with respect to the first and second plates 42, 44. The rotor 52 is disposed along with slidable vanes 66 into the bore 62. The second plate 44 is arranged into abutting engagement with the other of the first and second sides 46*a*, 46*b*. The first and second plates 42, 44 are secured about the intermediate plate 46 and rotor 52. The motor 48 is mounted to the first plate 42, coupling the motor 48 to the rotor 52.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples. For example, the disclosed pump may be used in applications other than vehicle evaporative systems.

Although an example embodiment has been disclosed, a worker of ordinary skill in this art would recognize that certain modifications would come within the scope of the claims. For that reason, the following claims should be studied to determine their true scope and content.

What is claimed is:

1. A rotary vane pump comprising:

a housing including first and second plates respectively secured to first and second opposing sides of an intermediate plate;

wherein the intermediate plate includes a bore and inlet and outlet ports, the first side having a first passage formed in the intermediate plate that fluidly connects the bore with the inlet port, the second side having a second passage formed in the intermediate plate that fluidly connects the bore with the outlet port, and wherein the intermediate plate is reversible with respect to the first and second plates such that either of the first side and the second side can mate with either of the first plate and the second plate, the intermediate plate is symmetrical about an axis between positions 180° apart, so that a first surface and a second surface provided respectively by the first side and the second side, as well as the corresponding first passage and second passage, are the same if rotated 180° about the axis; and a rotor arranged in the bore, the rotor supporting slidable vanes configured to pump fluid between the inlet and outlet ports.

2. The rotary vane pump of claim 1, wherein at least one of the first and second sides includes a pocket with a filter, the pocket fluidly arranged in one of the first and second passages.

3. The rotary vane pump of claim 1, wherein the first and second plates and the intermediate plate include holes with fasteners disposed therein to clamp the first and second plates to the intermediate plate, and a motor mounted to the first plate.

4. The rotary vane pump of claim 3, wherein the first and second plates and the intermediate plate include locating holes configured to receive pins during a rotary pump assembly procedure.

5. The rotary vane pump of claim 1, wherein the bore is elliptically shaped, and the rotor separates the bore into first and second cavities that are respectively in fluid communication with first and second passageways provided by each of the first and second passages.

6. The rotary vane pump of claim 1, wherein the bore is circular providing a singular cavity having a crescent shape.

7. The rotary vane pump of claim 1, wherein the first and second plates and the intermediate plate are plastic, and the first and second sides respectively abut the first and second plates without any additional sealing structure therebetween.

8. The rotary vane pump of claim 7, wherein the first and second sides respectively include first and second surfaces that are unmachined.

9. The rotary vane pump of claim 8, wherein the first and second surfaces are provided by injection molding.

10. The rotary vane pump of claim 1, wherein the intermediate plate has an outer peripheral surface and wherein the bore is defined by a peripheral edge extending about a center axis, and wherein:

the first passage
is radially inward of the outer peripheral surface,
is radially outward of the peripheral edge, and
extends from the inlet port to the bore; and the second passage
is radially inward of the outer peripheral surface,
is radially outward of the peripheral edge, and
extends from the outlet port to the bore.

11. The rotary vane pump of claim 10, wherein the first and second plates and the intermediate plate include one or more attachment openings and/or one or more locator openings, and wherein the first and second passages are formed radially inward of the one or more attachment openings and/or one or more locator openings.

12. The rotary vane pump of claim 1, including at least one pocket formed in at least one of the first and second opposing sides, wherein the at least one pocket fluidly connects an associated one of the inlet port and outlet port to the respective first passage and second passage.

13. The rotary vane pump of claim 12, wherein the at least one pocket comprises a first pocket formed in the first side that fluidly connects the inlet port to the first passage and a second pocket formed in the second side that fluidly connects the outlet port to the second passage.

14. The rotary vane pump of claim 13, including a first cavity in the bore on one side of the rotor and a second cavity in the bore on an opposite side of the rotor, and wherein the first passage includes a first passageway fluidly connecting the first pocket to a low pressure side of the first cavity and a second passageway fluidly connecting the first pocket to a low pressure side of the second cavity, and wherein the second passage includes a first passageway fluidly connecting the second pocket to a high pressure side of the first cavity and a second passageway fluidly connecting the first pocket to a high pressure side of the second cavity.

15. An evaporative emissions system comprising:

an evaporative component;

a pump fluidly connected to the evaporative component, the pump including:

a housing including first and second plates respectively secured to first and second opposing sides of an intermediate plate;

wherein the intermediate plate includes a bore and inlet and outlet ports, the first side having a first passage formed in the intermediate plate about a periphery of the bore and that fluidly connects the bore with the inlet port, the second side having a second passage formed in the intermediate plate about a periphery of the bore and that fluidly connects the bore with the outlet port, and wherein the intermediate plate is reversible with respect to the first and second plates such that either of the first side and the second side can mate with either of the first plate and the second plate, the intermediate plate is symmetrical about an axis between positions 180° apart, so that a first surface and a second surface provided respectively by the first side and the second side, as well as their corresponding first passage and second passage, are the same if rotated 180° about the axis; and a rotor arranged in the bore, the rotor supporting vanes configured to pump fluid between the inlet and outlet ports; and a controller in communication with the pump, the controller configured to maintain a pressure on the system during a leak test procedure.

16. The system of claim 15, wherein the evaporative component includes at least one of a charcoal canister and a fuel tank, and comprising at least one valve arranged a closed position during the leak test procedure.

17. The system of claim 16, wherein the at least one valve is a check valve and another valve, the check valve arranged downstream from the outlet port.

18. The system of claim 15, comprising a pressure gauge in communication with the controller and configured to monitor a system pressure during the leak test procedure.

19. The system of claim 15, wherein at least one of the first and second sides includes a pocket with a filter, the pocket fluidly arranged in one of the first and second passages.

20. The system of claim 15, wherein the first and second plates and the intermediate plate are plastic, and the first and second sides respectively abut the first and second plates without any additional sealing structure therebetween, the first and second sides respectively include first and second surfaces that are unmachined.

21. The system of claim 15, wherein the intermediate plate has an outer peripheral surface and wherein the bore is defined by a peripheral edge extending about a center axis, and wherein the first and second plates and the intermediate plate include one or more attachment openings and/or one or more locator openings located radially inward of the outer peripheral surface, and wherein the first and second passages are formed radially outward of the peripheral edge of the bore and radially inward of the one or more attachment openings and/or one or more locator openings.

22. The system of claim 15, including:

a first pocket formed in the first side that fluidly connects the inlet port to the first passage and a second pocket formed in the second side that fluidly connects the outlet port to the second passage; and a first cavity in the bore on one side of the rotor and a second cavity in the bore on an opposite side of the rotor, and wherein the first passage includes a first passageway fluidly connecting the first pocket to a low pressure side of the first cavity and a second passageway fluidly connecting the first pocket to a low pressure side of the second cavity, and wherein the second passage includes a first passageway fluidly connecting the second pocket to a high pressure side of the first cavity and a second passageway fluidly connecting the first pocket to a high pressure side of the second cavity.

23. A method of assembling a rotary vane pump, comprising the steps of:

arranging a first plate into abutting engagement with either a first side or a second side of an intermediate plate that is reversible with respect to the first plate, the intermediate plate includes a bore and inlet and outlet ports, the first side having a first passage formed in the intermediate plate about a periphery of the bore wherein the first passage fluidly connects the bore with the inlet port, and the second side having a second passage formed in the intermediate plate about the periphery of the bore and that fluidly connects the bore with the outlet port;

disposing a rotor with slidable vanes into the bore in the intermediate plate;

arranging a second plate into abutting engagement with the other of the first and second sides; and securing the first and second plates about the intermediate plate and rotor, such that either of the first side and the second side can mate with either of the first plate and the second plate, the intermediate plate is symmetrical about an axis between positions 180° apart, so that a first surface and a second surface provided respectively by the first side and the second side, as well as their corresponding first passage and second passage, are the same if rotated 180° about the axis.

24. The method of claim 23, comprising a step of mounting a motor to the first plate, wherein the motor is coupled to the rotor.

25. The method of claim 23, wherein at least one of the first and second sides includes a pocket with a filter.

26. The method of claim 23, wherein the intermediate plate has an outer peripheral surface and wherein the bore is defined by a peripheral edge extending about a center axis, and wherein the first and second passages are radially inward of the outer peripheral surface and radially outward of the peripheral edge.

27. The method of claim 26, wherein:

the first and second plates and the intermediate plate include one or more attachment openings and/or one or more locator openings, and wherein the first and second passages are formed radially inward of the one or more attachment openings and/or one or more locator openings; and/or a first pocket is formed in the first side that fluidly connects the inlet port to the first passage, a second pocket is formed in the second side that fluidly connects the outlet port to the second passage, a first cavity is in the bore on one side of the rotor and a second cavity is in the bore on an opposite side of the rotor, and wherein:

the first passage includes a first passageway fluidly connecting the first pocket to a low pressure side of the first cavity and a second passageway fluidly connecting the first pocket to a low pressure side of the second cavity; and the second passage includes a first passageway fluidly connecting the second pocket to a high pressure side of the first cavity and a second passageway fluidly connecting the first pocket to a high pressure side of the second cavity.

* * * * *